July 24, 1951 — R. M. SCOVILL — 2,562,131
TOOL FOR REMOVING HUB RETAINING NUTS
Filed Aug. 3, 1950
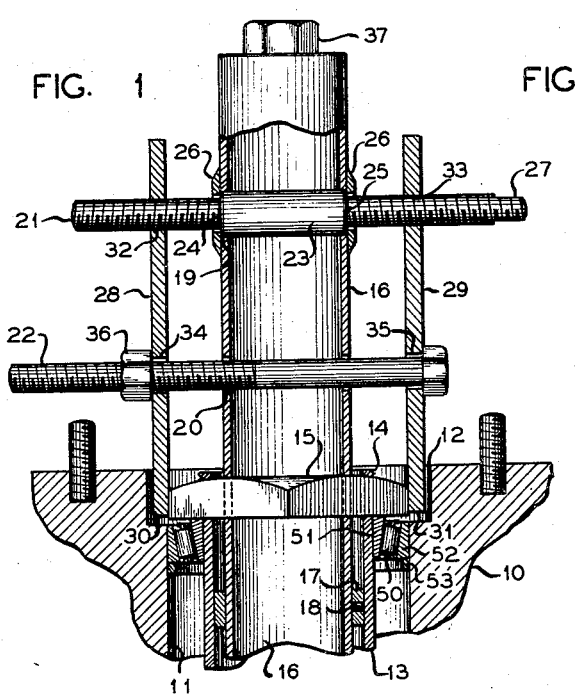
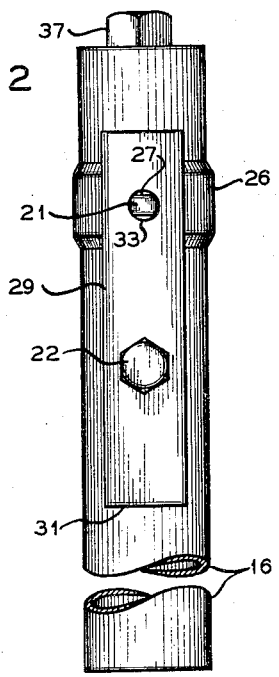
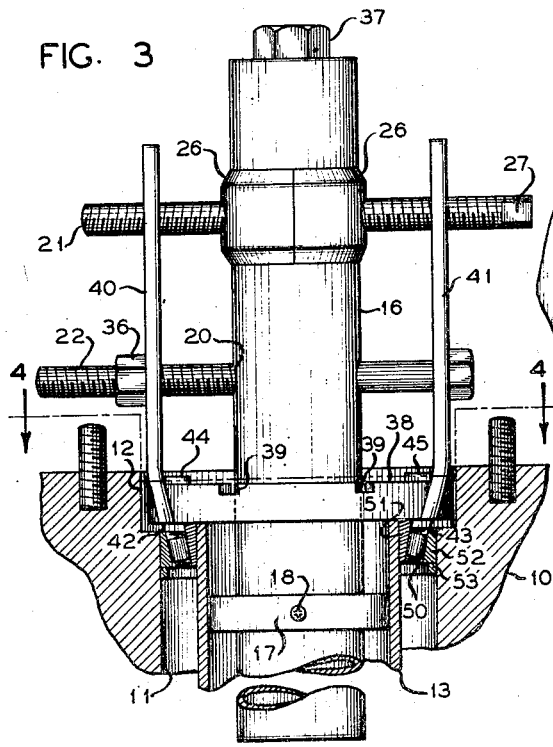
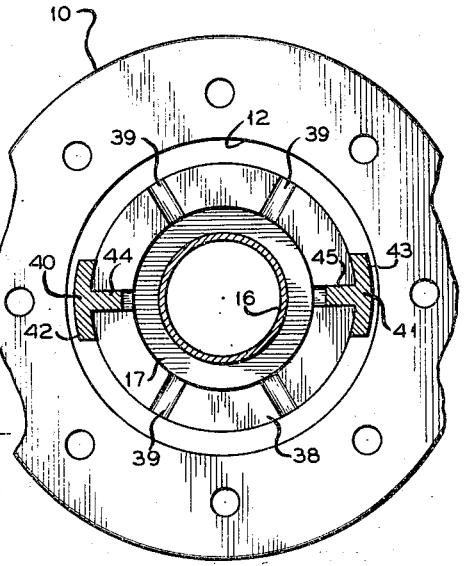
INVENTOR.
R. M. SCOVILL Patented July 24, 1951

2,562,131

UNITED STATES PATENT OFFICE 2,562,131

TOOL FOR REMOVING HUB RETAINING NUTS

Richard M. Scovill, Miami, Fla.

Application August 3, 1950, Serial No. 177,478

4 Claims. (Cl. 81—163)

This invention relates to tools by the use of which certain operations may be more easily accomplished as, for example, to wrenches or the like employed in the removal of nuts of various kinds.

Specifically, the invention relates to wrench type equipment for removing hub retaining nuts or the like, and particularly hub retaining or other nuts, or rotary members access to which is more or less limited or restricted.

It is an object of the invention to provide a tool or equipment for removing hub retaining nuts or the like which tool or equipment is constructed so that it can be easily applied in a manner that a nut can be positively gripped and subsequently removed.

Another object of the invention is to provide a tool or equipment for removing hub retaining nuts or the like in constricted areas which equipment or tool is of simple and inexpensive construction as well as one having a positive gripping action when applied and which can be operated with minimum effort to accomplish a desired result.

Other objects and advantages of the invention will become apparent from the following description taken in conjunction with the accompanying drawings, wherein:

Fig. 1 is a longitudinal section illustrating one application of the invention;

Fig. 2, a side elevation taken at right angles to the plane of Fig. 1;

Fig. 3, a side elevation with parts in section of a slightly modified form; and, Fig. 4, a section on the line 4—4 of Fig. 3.

Briefly stated the invention comprises a pair of wrench strips with means for holding and moving them toward and from each other for gripping opposite sides of a nut as well as for rotating the mechanism to remove the nut after the device has been applied and the nut has been gripped.

With continued reference to the drawings, a body such as, for example, a hub 10 may have an opening 11 and a slightly enlarged recess 12. A sleeve 13 having an externally threaded portion 14 is adapted to receive a nut 15 of polygonal form, as disclosed in Fig. 1, and later to be described, within said hub. A tapered roller bearing 50 is disposed within the opening 11 and comprises inner and outer races 51 and 52. The outer race 52 is retained in a predetermined position within the opening 11, by means of a shoulder 53 which may be annular and the inner race 51 is brought into engagement with the roller 50 by means of the threaded nut 15, thereby permitting the hub 10 to rotate freely about the cylinder 13.

Within the bore of the sleeve 13 another sleeve 16 is concentrically mounted. Concentricity is maintained by means of a collar or bushing 17 held in place by a set screw 18. The sleeve 16 serves as a mounting for the wrench structure or mechanism by means of which the nuts are adapted to be removed.

The sleeve 16 is provided with upper and lower openings 19 and 20 for reception respectively of an adjusting screw 21 and a locking bolt 22. The adjusting screw 21 is provided with a central enlarged portion 23 having shoulders 24 and 25 at its opposite ends. This enlarged portion forms a bearing for the tube 16. In order to maintain the adjusting screw in its proper axial position a pair of semi-cylindrical collars 26 are welded or otherwise fastened around the exterior of the tube, such collars having openings in which the ends of the adjusting screw are received, but such openings are of a diameter slightly less than that of the openings 19 in the sleeve 16. Consequently the adjusting screw is maintained in proper position within the tube 16.

The ends of the adjusting screw 21 are provided with oppositely disposed right and left hand threaded portions and at one end the adjusting screw is provided with a flattened wrench engaging extension 27 by means of which the adjusting screw can be rotated.

At opposite sides of the tube 16 are mounted wrench members which may be plates 28 and 29 as shown having jaws or extremities 30 and 31 respectively for engagement with opposite sides of a nut such as the nut 15. In order to mount the wrench members 28 and 29 and adjust the distance between them the wrench member 28 is provided with a threaded opening 32 in which is received the left hand threads of the adjusting screw 21, and the wrench member 29 is provided with a threaded opening 33 receiving the right hand threads of the adjusting screw 21.

Accordingly, due to the right and left hand threads, when a wrench is applied to the flattened end 27 of the adjusting screw 21 and the same is rotated in a clockwise direction the wrench members will be moved apart equidistantly and when the adjusting screw 21 is rotated in a contra-clockwise direction the wrench members will be moved toward each other in a similar manner. By this construction the jaws 30 and 31 may be readily moved into and released from engagement with a nut such as the nut 15.

In order to lock the jaws 30 and 31 of the wrench members 28 and 29 into firm or positive contact with a nut such as the nut 15, the wrench members 28 and 29 may be provided with openings 34 and 35 for receiving the locking bolt 22. When the nut 36 of the bolt 22 is threaded onto the bolt and the jaws of the wrench members are in engagement with a nut, pressure exerted by the bolt will bind the wrench members against opposite sides of the nut to which the device is applied.

After the device is applied in the manner described it can be rotated to remove a nut of the character of the nut 15, and in order to facilitate the rotation of the nut removing structure the outer end of the tube 16 is provided with a polygonal surface such as the nut 37 welded to the end of the tube as shown or if desired, this type of polygonal wrench engaging portion may be provided in any desired manner.

The nut 15 disclosed in Fig. 1 is of the hexagonal type but where nuts of other types are employed the invention may be modified accordingly, for example, in Fig. 4 a castellated nut 38 is employed having a series of slots 39 for reception of ribs on appropriate wrench or sprocket mechanism by means of which the nut may be removed. However, in order to properly engage and grip this modified type of nut the wrench members 28 and 29 are inappropriate and must be modified. Accordingly, wrench members 40 and 41 are employed having jaws 42 and 43 which converge slightly at their extremities to conform to and snugly engage the surface of the nut. Further, the end portions of the wrench members have key portions 44 and 45 for reception in the slots 39. The wrench members each have an upper threaded and a lower unthreaded opening for reception of the adjusting and locking bolts 21 and 22 previously described in connection with the structure of Fig. 1. Also the tube 16 is identical in both of these figures.

It will be understood that by means of the above described construction the wrench equipment can be readily applied and used to remove a nut in a minimum of time.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A tool for removing retaining nuts comprising a supporting tube having means for axially mounting the same relative to a nut to be removed, a pair of diametrically disposed rotatable members carried by said tube, one having its ends threaded in opposite directions and the other having a head on one end and an adjustable nut on the other, jaw carrying wrench members disposed in substantially parallel relation and having threaded engagement with said threaded member and confined between the head on said other member and the nut so that upon rotation of the member with the opposite threads said jaw carrying members may be adjusted toward and from each other and locked in contact with the nut to be removed by said other member, and means whereby said axially disposed tube can be rotated for applying and removing a nut.

2. A device of the character described comprising a support, an adjusting member having a cylindrical bearing portion and right and left hand threaded portions of smaller diameter extending therefrom with a shoulder formed at each end of said bearing portion, said support having spaced walls provided with openings receiving said bearing portion, the exterior surfaces of said spaced walls and said shoulders being correspondingly spaced, a pair of retainers carried by said support on the exterior of said walls, said retainers having openings in which the threaded ends of said adjusting member are snugly received and said adjusting member maintained against axial movement, and a pair of opposed jaw carrying wrench members threadedly mounted one on each of said right and left hand threads of said adjusting member.

3. A tool for removing a retaining threaded member of tubular character comprising a tube of a size to telescope into said retaining member, a bearing for locating said tube concentrically of said retaining member, an adjusting screw, an enlarged unthreaded bearing surface on the adjusting screw, collars engaging the ends of said enlarged surface for maintaining said adjusting screw in the proper transverse position relative to said tube, and a pair of jaw carrying wrench members disposed in substantially parallel relation and having threaded engagement with said screw.

4. A device of the character described comprising a support having means for axially mounting the same relative to a nut to be rotated, a transversely disposed member carried by said support, jaw carrying wrench members disposed in substantially parallel relation and adjustably carried by said transversely disposed member, means on said member to adjust the position of said wrench members relative to each other, a second transversely disposed member carried by said support and engaging said wrench members and means on said second member to lock said wrench members in engagement with said nut.

RICHARD M. SCOVILL.

REFERENCES CITED

The following references are of record in the file of this patent:

UNITED STATES PATENTS

| Number | Name | Date |
|--------|------|------|
| 210,684 | Goodrich | Dec. 10, 1878 |
| 897,857 | Spaulding | Sept. 1, 1908 |
| 899,336 | Show | Sept. 22, 1908 |
| 1,047,046 | Gronkowski | Dec. 10, 1912 |
| 1,612,713 | Fienberg | Dec. 28, 1926 |
| 2,088,785 | Gifford | Aug. 3, 1937 |

FOREIGN PATENTS

| Number | Country | Date |
|--------|---------|------|
| 358,772 | France | Mar. 7, 1906 |
| 721,295 | Germany | June 1, 1942 |